(12) United States Patent
Nakamura et al.

(10) Patent No.: US 6,486,976 B1
(45) Date of Patent: *Nov. 26, 2002

(54) IMAGE READING APPARATUS

(75) Inventors: Yasuyuki Nakamura; Akihiro Yoshitani, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,895

(22) Filed: Dec. 18, 1997

(30) Foreign Application Priority Data

Dec. 20, 1996 (JP) .............................. 8-341197

(51) Int. Cl.$^7$ ................................. H04N 1/04
(52) U.S. Cl. ....................... 358/474; 358/468
(58) Field of Search ................ 358/400, 401, 358/434, 443, 474, 468

(56) References Cited

U.S. PATENT DOCUMENTS

| 4,879,470 A | | 11/1989 | Sugawa et al. ............ 250/578 |
| 5,353,124 A | * | 10/1994 | Chou et al. ................ 358/400 |
| 5,499,109 A | * | 3/1996 | Mathur ........................ 358/400 |
| 5,524,071 A | * | 6/1996 | Yokomizo ................... 382/284 |
| 5,812,733 A | * | 9/1998 | Eto .............................. 386/68 |
| 5,872,636 A | * | 2/1999 | Kohtani et al. ............. 358/298 |
| 5,926,525 A | * | 7/1999 | Kim ........................ 379/88.23 |
| 2001/0043272 A1 | * | 11/2001 | Sato et al. ................... 348/213 |

FOREIGN PATENT DOCUMENTS

JP          404165754 A  *  6/1992  ............ H04N/1/00

* cited by examiner

*Primary Examiner*—Jerome Grant, II
(74) *Attorney, Agent, or Firm*—Fitzpatrick, Cella, Harper & Scinto

(57) ABSTRACT

When an image read start command is received from a PC, an image reading unit first sequentially reads an image of an original. An output signal of the image reading unit is processed by an analog signal processing circuit, an A/D converter, and an image processing circuit and is supplied to a transfer control circuit. When an instruction from the PC indicates a direct transfer mode, the transfer control circuit outputs the image data from the image processing circuit as it is to an interface. When the instruction from the PC indicates a temporary storage mode, the transfer control unit temporarily stores the image data into a storage medium of an auxiliary storage device. When there is a reading request from the PC, the transfer control circuit reads out the image data which is stored into the auxiliary storage device and transfers it to the PC through the interface.

14 Claims, 7 Drawing Sheets

IMAGE READING APPARATUS

BACKGROUND OF THE INVENTION

1. Field of the Invention

The invention relates to an image reading apparatus and, more particularly, to an image reading apparatus such as an image scanner or the like for inputting an image to, for example, a personal computer and other information processing apparatus.

2. Related Background Art

Information equipment having an advanced function and multifunctions represented by a personal computer is widely spread, and by connecting various peripheral equipment thereto, the information equipment can be allowed to perform a variety of works. As such peripheral equipment, there are image input apparatuses such as image scanner, electronic still camera, digital video camera, and the like. Particularly, the image scanner is widely used as means for converting documentation information to electronic data or for recording it as an image.

FIG. 6 shows a schematic constructional block diagram in which an image scanner is connected to a personal computer.

In an image scanner 110, reference numeral 112 denotes a CPU for controlling the whole scanner 110; 114 an image reading unit which is constructed by a light source, a CCD line sensor, and the like and converts an image of an original to an electric signal; 116 an analog signal processing circuit for performing an analog process such as a gain control or the like to an analog image signal which is outputted from the image reading unit 114; 118 an A/D converter for converting an output of the analog signal processing circuit 116 to a digital signal; 120 a digital image processing circuit for performing image processes such as shading correcting process, gamma converting process, variable magnification process, and the like to output data of the A/D converter 118 by using a memory 122; and 124 an interface for outputting the digital image data which was image processed by the digital image processing circuit 120 to the outside. The interface 124 is based on the standard such as, SCSI, Bi-Centronics, or the like which is used as a standard interface in a personal computer. The interface 124 is connected to a personal computer 130.

As an external storage device 132, a magnetooptic disk drive, a floppy disk drive, or the like is equipped to the personal computer (hereinafter, abbreviated as a PC) 130.

FIG. 7 is a flowchart showing the operation of the image scanner shown in FIG. 6. When a start command to start the image reading operation is issued from the PC 130 to the image scanner 110, the interface 124 analyzes the command from the PC 130 and notifies the CPU 112 of an analysis result. Prior to performing the process corresponding to the notification, the interface 124 outputs an interruption signal indicating that there is the instruction to start the image reading operation from the PC 130 to the CPU 112. When the interruption signal of the reading start instruction is received from the interface 124, the CPU 112 instructs the start of the reading operation to the image reading unit 114, analog signal processing circuit 116, A/D converter 118, and digital image processing circuit 120 (step S101).

First, the image reading unit 114 sequentially reads the image of the original (S102). The analog signal processing circuit 116 executes processes such as a gain control and the like to the analog image signal that is outputted from the image reading unit 114 (S103). The image signal processed by the analog signal processing circuit 116 is converted into a digital signal by the A/D converter 118 (S104). The digital signal is temporarily stored in the memory 122 and is subjected to a digital image process by the digital image processing circuit 120 (S105). As image processes which are executed by the digital image processing circuit 120, there are a shading correcting process for correcting variations of a light source and a line sensor or the like by image data serving as a white reference, a gamma converting process for changing gamma characteristics of the input image data, a variable magnification process for reducing or enlarging an image in accordance with an image size to be outputted, and the like. Any one of those processes is executed by using the memory 122 connected to the digital image processing circuit 120.

The image data processed by the digital image processing circuit 120 is sequentially transferred to the interface 124 (S106). The reading operation and the transferring operation of the image in steps S102 to S106 are repetitively executed until the reading operation of the whole area or all of the designated range of the original is finished (S107).

The interface 124 converts the image data transferred from the digital image processing circuit 120 to image data of a format according to the transfer standard with the PC 130 and sequentially transfers the converted image data to the PC 130. The PC 130 displays the image data sent from the image scanner 110 (specifically speaking, interface 124) onto a screen of a monitor display of the PC 130. The PC 130 stores the image data from the image scanner 110 to an internal hard disk (not shown) as necessary. To preserve the read image data for a long time or to use it by another computer, the image data stored in the hard disk is read out and copied to a storage medium such as magnetooptic disk, floppy disk, or the like by the external storage device 132.

In such an image scanner, while the original is being read, the read image data is sequentially transferred to the PC 130. Therefore, so long as the PC 130 cannot simultaneously make a plurality of application softwares operative, another application software cannot be used until the end of the reading operation of the original.

In case of reading the original in color, since its data amount is extremely large, it takes a longer time to transfer the image data from the image scanner 110 to the PC 130 by a time corresponding to such a large data amount and a time that is occupied in the PC 130 is long. In case of a color image, further, when considering a copy to an external storage medium such as magnetooptic disk, floppy disk, or the like, an enough space capacity of the internal hard disk also needs to be assured.

Further, the personal computer is connected to a network and used and an image input apparatus such as an image scanner or the like serving as peripheral equipment of the computer can be also connected to the network. However, in case of the image scanner, there are the following problems. That is, in case of reading an original by the image scanner, the original is put on an original base plate and is first prescanned at a low resolution. A read image is confirmed on a monitor screen, a range to be actually read, a reading resolution, or the like is designated, and the image scan is executed. In case of connecting the image scanner to the network and using it, the operator has to reciprocate at least twice between the own computer and the image scanner in a manner such that (1) he goes to the image scanner and puts the original thereon, (2) he returns to his seat and designates a scanning range and a reading resolution while looking at a preview image by a monitor screen of a client computer, thereby allowing the scan to be executed, and (3) he goes to the image scanner and gets the original.

When the original is obliquely put on the original base plate, he has to further reciprocate between the own computer and the image scanner in order to correct the position of the original. Since a period of time when there is no original on the operator side is long, there is a possibility such that the original is lost due to a theft or the like.

SUMMARY OF THE INVENTION

It is an object of the invention to reduce an image reading time.

Another object of the invention is to provide an image reading system which can be easily used for the operator of the image reading system.

To accomplish the above objects, according to an embodiment of the invention, there is provided an image scanner which can be used by connecting to an information processing apparatus, comprising: reading means for reading an image of an original and outputting an image signal; storing means for storing the image signal; transfer means for transferring the image signal to the information processing apparatus; and mode switching means for switching a first mode to store the image signal into the storing means and to transfer the stored image signal by the transfer means and a second mode to transfer the image signal by the transfer means without storing it into the storing means.

According to another embodiment, there is provided an image scanner which can be used by connecting to an information processing apparatus, comprising: input means for inputting a read command; reading means for reading an image of an original and outputting image data; storing means for storing the image data; an interface, connected to the information processing apparatus, for inputting and outputting information; and control means for controlling in a manner such that the reading means reads the original image in accordance with the read command and the storing means stores the image signal and the image signal stored in the storing means is read out in response to the command from the information processing apparatus and is outputted to the information processing apparatus through the interface.

With the above construction, an image reading time can be reduced and an image reading system which can be easily used by the operator can be provided.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will now be described in detail hereinbelow with reference to the drawings.

Figure 1:
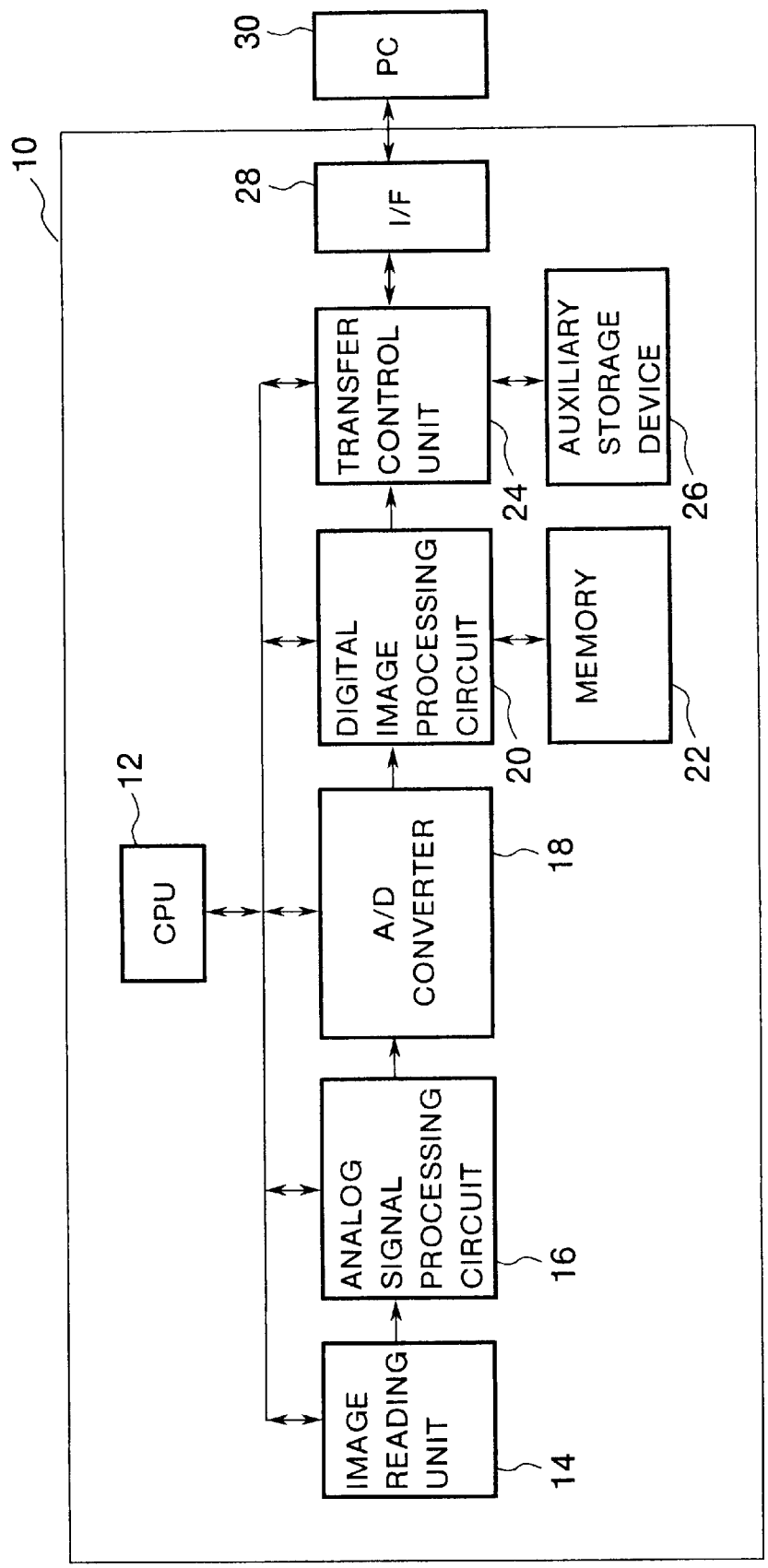
FIG. 1 is a schematic constructional block diagram of the first embodiment of the invention.

FIG. 1 shows a schematic constructional block diagram of an embodiment of the invention. An image scanner 10 as an image reading apparatus operates in a state where it is connected to a personal computer 30 as shown in FIG. 1.

In an image scanner 10, reference numeral 12 denotes a CPU for controlling the whole image scanner 10; 14 an image reading unit which is constructed by a light source, a CCD line sensor, and the like and converts an image of an original to an electric signal; 16 an analog signal processing circuit for performing an analog process such as a gain control or the like to an analog image signal which is outputted from the image reading unit 14; 18 an A/D converter for converting an output of the analog signal processing circuit 16 to a digital signal; 20 a digital image processing circuit for performing digital image processes such as shading correcting process, gamma converting process, variable magnification process, and the like to output data of the A/D converter 18 by using a memory 22; 24 an interface for outputting the image data processed by the digital image processing circuit 20 to the outside and storing into an auxiliary storage device 26 and for controlling and managing an external output of the image data read out from the auxiliary storage device 26; 28 an interface for outputting the data from the transfer control unit 24 to the outside; and 30 the personal computer (PC) connected to the interface 28.

The auxiliary storage device 26 comprises a memory card of a large capacity, a hard disk device, or a driving device of a removable disk such as magnetooptic disk, floppy disk, or the like. Although the details will be explained hereinlater, the auxiliary storage device 26 functions as a buffer for temporarily storing the image data read by the image reading unit 14. Further, the memory card, disk, or the like can be removed from the device and can be carried. The interface 28 comprises the USB, IEEE 1394, SCSI, Bi-Centronics, or the like.

Figure 2:
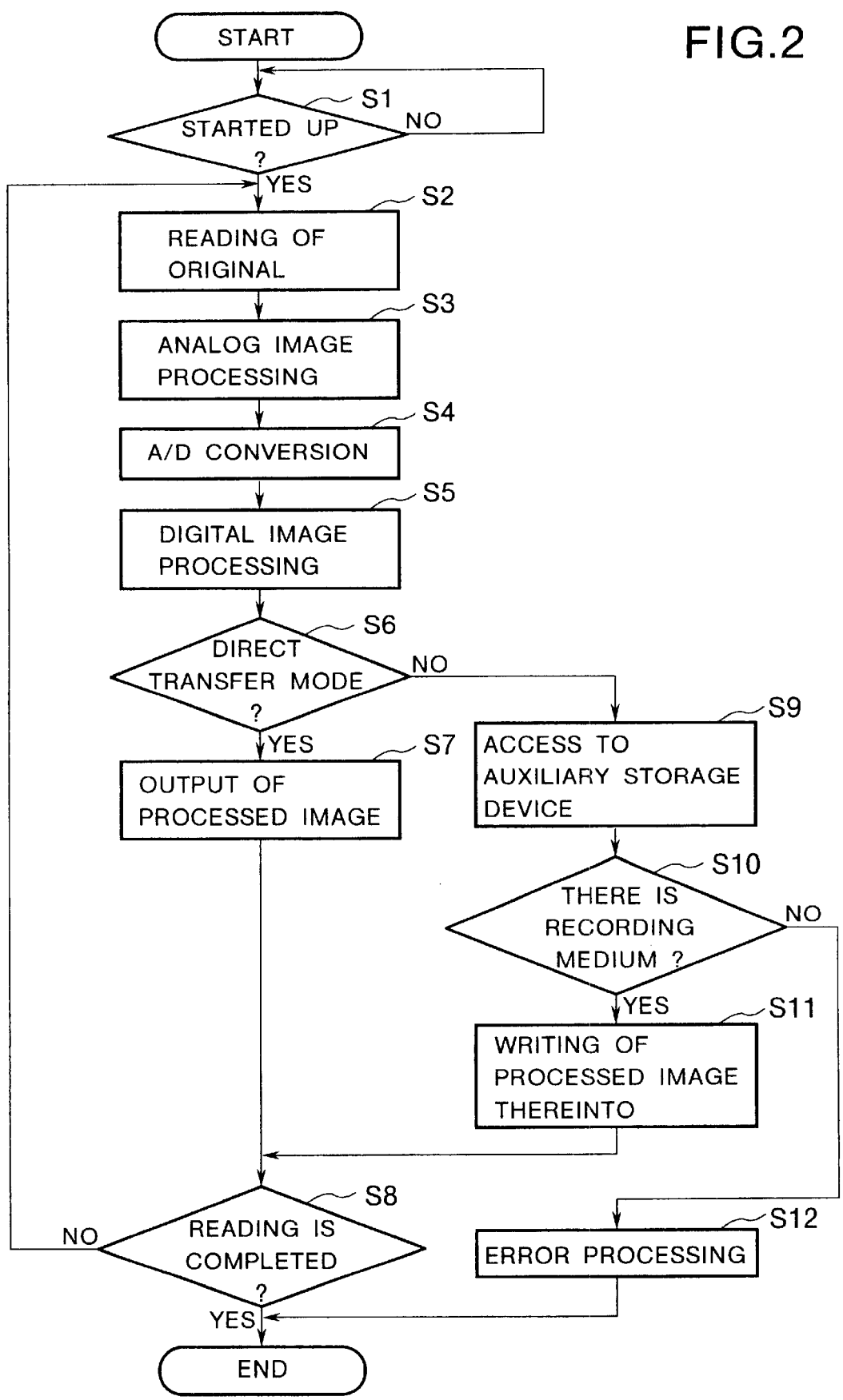
FIG. 2 is a diagram showing a processing flow of the embodiment.

FIG. 2 is a flowchart showing a flow of processes of the embodiment. The operation of the embodiment will now be described with reference to FIG. 2.

When a start command to start the reading operation of an image is outputted from the PC 30 to the image scanner 10, the interface 28 analyzes the command from the PC 30 and notifies the CPU 12 of an analysis result. Prior to notifying, the interface 28 outputs an interruption signal indicating that there is the instruction to start the image reading operation from the PC 30 to the CPU 12. When receiving the interruption signal of the reading start instruction from the interface 28, the CPU 12 instructs the image reading unit 14, analog signal processing unit 16, A/D converter 18, digital image processing circuit 20, and transfer control unit 24 so as to start the reading operation (S1).

First, the image reading unit 14 sequentially reads the image of the original (S2). The analog signal processing circuit 16 performs processes such as gain control and the like to the analog image signal which is outputted from the image reading unit 14 (S3). The image signal processed by the analog signal processing circuit 16 is converted to a digital signal by the A/D converter 18 (S4) and is temporarily stored into the memory 22 and is subjected to digital image processes by the digital image processing circuit 20 (S5). As image processes which are executed in the digital image processing circuit 20, there are a shading correcting process for correcting variations of a light source and a line sensor or the like by image data serving as a white reference, a gamma converting process for changing gamma characteristics of the input image data, a variable magnification process for reducing or enlarging an image in accordance with an image size to be outputted, and the like. Any one of those processes is executed by using the memory 22 connected to the digital image processing circuit 20. In the case where the image reading unit 14 uses a CCD line sensor of three lines which can read a color image, since line deviations occur in the subscanning direction among red (R), green (G), and blue (B), the line deviations are also corrected by the memory 22.

In the image reading apparatus of the embodiment, either one of a mode in which after the image data read by the image reading unit 14 was temporarily stored into the auxiliary storage device 26, it is transferred to the PC 30, and a mode such that the image data is directly transferred to the PC 30 without passing through the auxiliary storage device 26 can be selected. In the embodiment, the former mode is called a temporary storage mode and the latter is called a direct transfer mode. The CPU 12 outputs an inquiry of a processing situation to the PC 30, thereby detecting whether the PC 30 is in a busy state in which another process is being executed or not. When it is detected that the PC 30 is in the busy state, the CPU 12 switches the image reading mode to the temporary storage mode. When it is detected that the PC 30 is not in the busy state, the CPU 12 switches the image reading mode to the direct transfer mode (S6). In case of the direct transfer mode, the transfer control unit 24 sequentially sends the image data processed by the image processing circuit 20 to the interface 28. The interface 28 converts the image data from the transfer control unit 24 to a format according to the interface standard of the connected PC 30 and sequentially transfers it to the PC 30 (S7). Each processing unit of the image scanner 10 repetitively executes the processes in steps S2 to S7 until the end of the reading operation of all of the image data of the original (S8).

When the image reading mode is not the direct transfer mode, namely, when it is the temporary storage mode (S6), the transfer control unit 24 transfers the image data processed by the image processing circuit 20 to the auxiliary storage device 26 and stores it to a storage medium such as magnetooptic disk, floppy disk, or the like loaded therein. That is, the transfer control unit 24 accesses to the auxiliary storage device 26 (S9) and confirms that the storage medium has been set in the auxiliary storage device 26 and, thereafter, sequentially writes the image data to the recording medium (S10, S11). When no storage medium is set in the auxiliary storage device 26 (S10), the CPU 12 executes a predetermined error process and finishes the reading operation of the image data (S12). Even in the temporary storage mode, the processes in steps S2 to S6 and S9 to S11 are repetitively executed until the reading operation of the whole area or all of the designated range of the original is finished (S8).

The operation to read out the image data stored in the storage medium of the auxiliary storage device 26 in the temporary storage mode to the PC 30 will now be described. When the PC 30 generates a command to instruct the extraction of the image data stored in the storage medium to (the interface 28 of) the image scanner 10, the interface 28 analyzes the command from the PC 30 and outputs an interruption signal indicative of an analysis result (in this example, the reading-out of the image data stored in the storage medium) to the CPU 12. In response to the interruption signal, the CPU 12 instructs the transfer control unit 24 so as to read out the image data stored in the storage medium. In accordance with this instruction, the transfer control unit 24 accesses to the auxiliary storage device 26, sequentially reads out the image data stored in the storage medium of the auxiliary storage device 26, and transfers it to the interface 28. In a manner similar to the direct transfer mode, the interface 28 converts the image data from the transfer control unit 24 to a format so as to match with the interface standard of the PC 30 and transfers the converted data to the PC 30. The above processes are repeated until all of the image data that is stored in the auxiliary storage device 26 is transferred to the PC 30.

The embodiment has been described with respect to the case where the auxiliary storage device 26 is the magnetooptic disk driving device or the floppy disk driving device. However, the invention is not limited to such a storage medium. It will be obviously understood that a solid-state memory device such as a memory card or the like, a hard disk, or the like can be also used so long as it has a large storage capacity such that the image data can be sufficiently stored.

Figure 3:
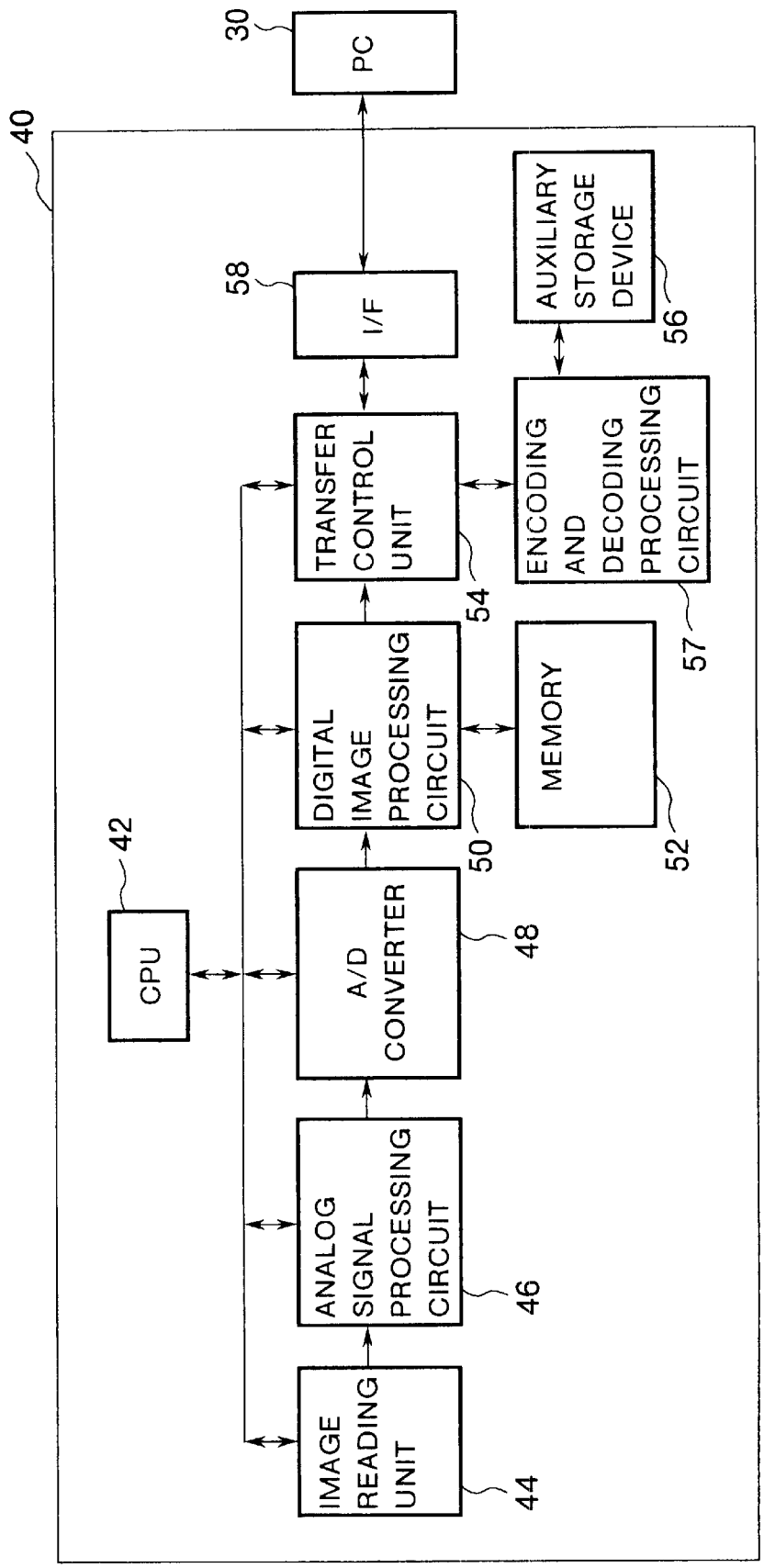
FIG. 3 is a schematic constructional block diagram of the second embodiment of the invention.

FIG. 3 shows a schematic constructional block diagram of the second embodiment of the invention. Reference numeral 40 denotes an image scanner serving as an image reading apparatus of the embodiment; 42 a CPU for controlling the whole image scanner 40; 44 an image reading unit which is constructed by a light source, a CCD line sensor, and the like and converts an image of an original to an electric signal; 46 an analog signal processing circuit for performing analog processes such as gain control and the like to an analog image signal which is outputted from the image reading unit 44; 48 an A/D converter for converting an output of the analog signal processing circuit 46 to a digital signal; and 50 a digital image processing circuit for performing digital image processes such as shading correcting process, gamma converting process, variable magnification process, and the like to output data of the A/D converter 48 by using a memory 52. The operations of the image reading unit 44, analog signal processing circuit 46, A/D converter 48, digital image processing circuit 50, and memory 52 are substantially the same as those of the image reading unit 14, analog signal processing circuit 16, A/D converter 18, digital image processing circuit 20, and memory 22 in the embodiment shown in FIG. 1, respectively.

Reference numeral 54 denotes a transfer control unit for managing an output of the read image data to the outside in a manner similar to the transfer control unit 24, and 56 indicates an auxiliary storage device for temporarily storing the read image data in a manner similar to the auxiliary storage device 26. It is a point different from the embodiment shown in FIG. 1 that an encoding and decoding processing circuit 57 for compressing and decompressing the image data is connected between the transfer control unit 54 and auxiliary storage device 56. That is, the encoding and decoding processing circuit 57 compresses and encodes the image data that is supplied from the transfer control circuit 54 to store into the auxiliary storage device 56 and supplies the compressed data to the auxiliary storage device 56. The auxiliary storage device 56 stores the compressed image data. The encoding and decoding processing circuit 57 also decompresses the compressed image data read out from the auxiliary storage device 56 and supplies the decompressed data to the transfer control circuit 54.

Reference numeral 58 denotes an interface for connecting the PC 30 in a manner similar to the interface 28.

Figure 4:
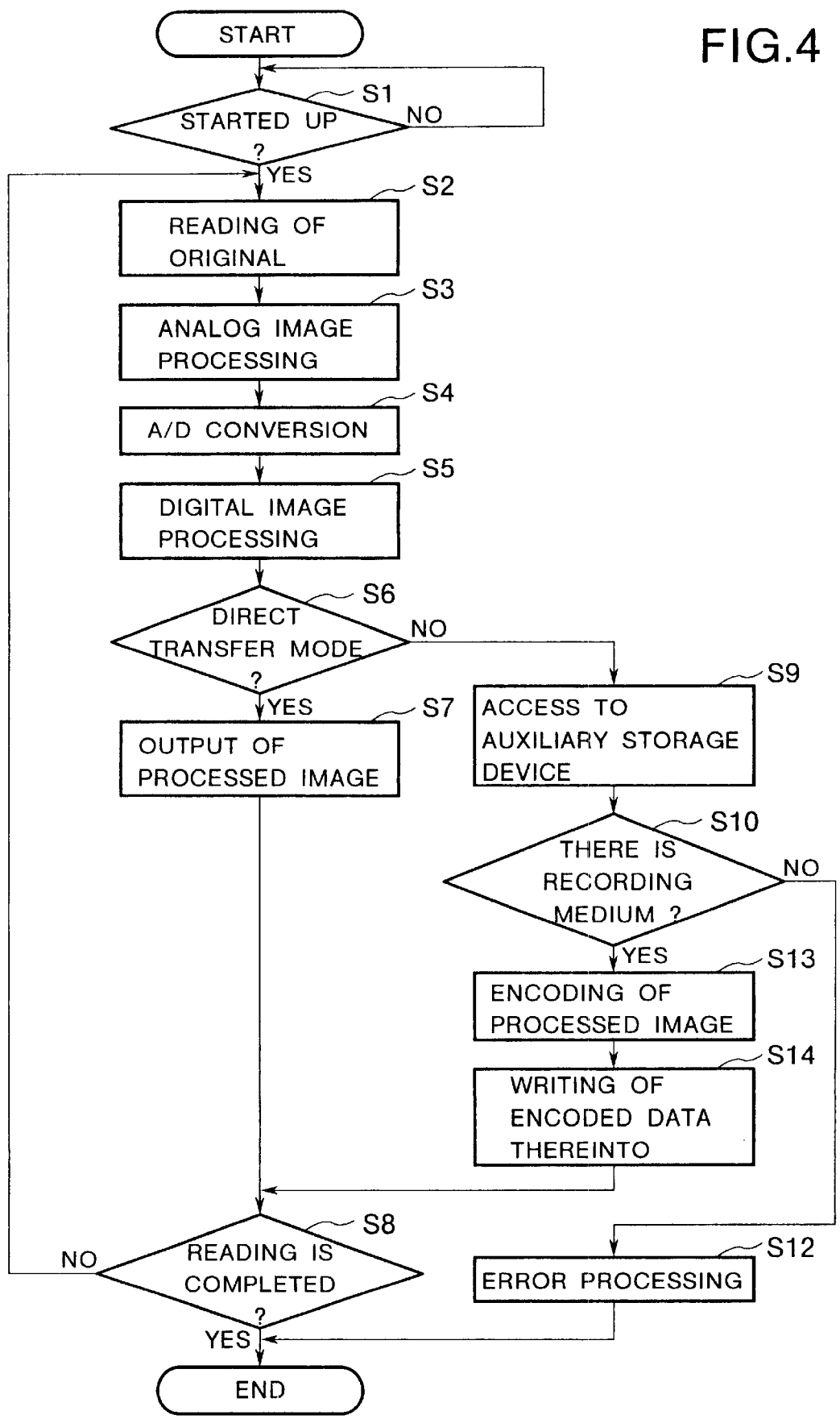
FIG. 4 is a diagram showing a processing flow of the second embodiment.

FIG. 4 shows an operation flowchart of the embodiment shown in FIG. 3. FIG. 4 differs from FIG. 2 with respect to the process after confirming (S10) that the storage medium has been set in the auxiliary storage device 56 while intending to access to the auxiliary storage device 56 (S9) in the temporary storage mode (S6). That is, the image data processed by the digital image processing circuit 50 is compressed by the encoding and decoding processing circuit 57 (S13) and written to the storage medium of the auxiliary storage device 56 (S14). As an image compressing system by the encoding and decoding processing circuit 57, any one of a reversible encoding system and an irreversible encoding system can be used. For example, any one of the encoding system such as JPEG system, JBIG, or the like and the system for compressing a text or the like can be used. It is desirable that the user can select a compression ratio or compressing conditions (including non-compression).

The operation when the image data written in the storage medium of the auxiliary storage device 56 is read out and transferred to the PC 30 will now be described. When the PC 30 outputs a command to instruct the extraction of the image data stored in the storage medium to (the interface 58 of) the image scanner 40, the interface 58 analyzes the command from the PC 30 and outputs an interruption signal indicative of an analysis result (in this example, the reading-out of the image data stored in the storage medium) to the CPU 42. In response to the interruption signal, the CPU 42 instructs the reading operation of the image data stored in the storage medium to the transfer control unit 54.

The transfer control unit 54 accesses to the auxiliary storage device 56 through the encoding and decoding processing circuit 57 in response to the above construction. When the data read out from the auxiliary storage device 56 is the non-compressed image data, the encoding and decoding processing circuit 57 transfers the image data to the transfer control circuit 54 without performing any process. When the data read out from the auxiliary storage device 56 is the compressed image data, the encoding and decoding processing circuit 57 decompresses it and transfers it to the transfer control circuit 54. The transfer control unit 54 transfers the image data from the encoding and decoding processing circuit 57 to the interface 58. The interface 58 converts the image data from the transfer control circuit 54 to a format so as to match with the interface standard of the PC 30 and transfers the converted data to the PC 30. The above processes are repeated until all of the image data that is stored in the auxiliary storage device 56 is transferred to the PC 30.

In the case where the image data which was compressed and encoded by the encoding and decoding processing circuit 57 can be decoded on the PC 30 side, the compressed image data can be also transferred as it is to the PC 30. By this method, the transfer time can be reduced and a deterioration of a picture quality due to the re-encoding or the like can be further reduced.

It will be obviously understood that a storage device other than the magnetooptic disk driving device and the floppy disk driving device can be also used as an auxiliary storage device 56 in a manner similar to the auxiliary storage device 26.

Figure 5:
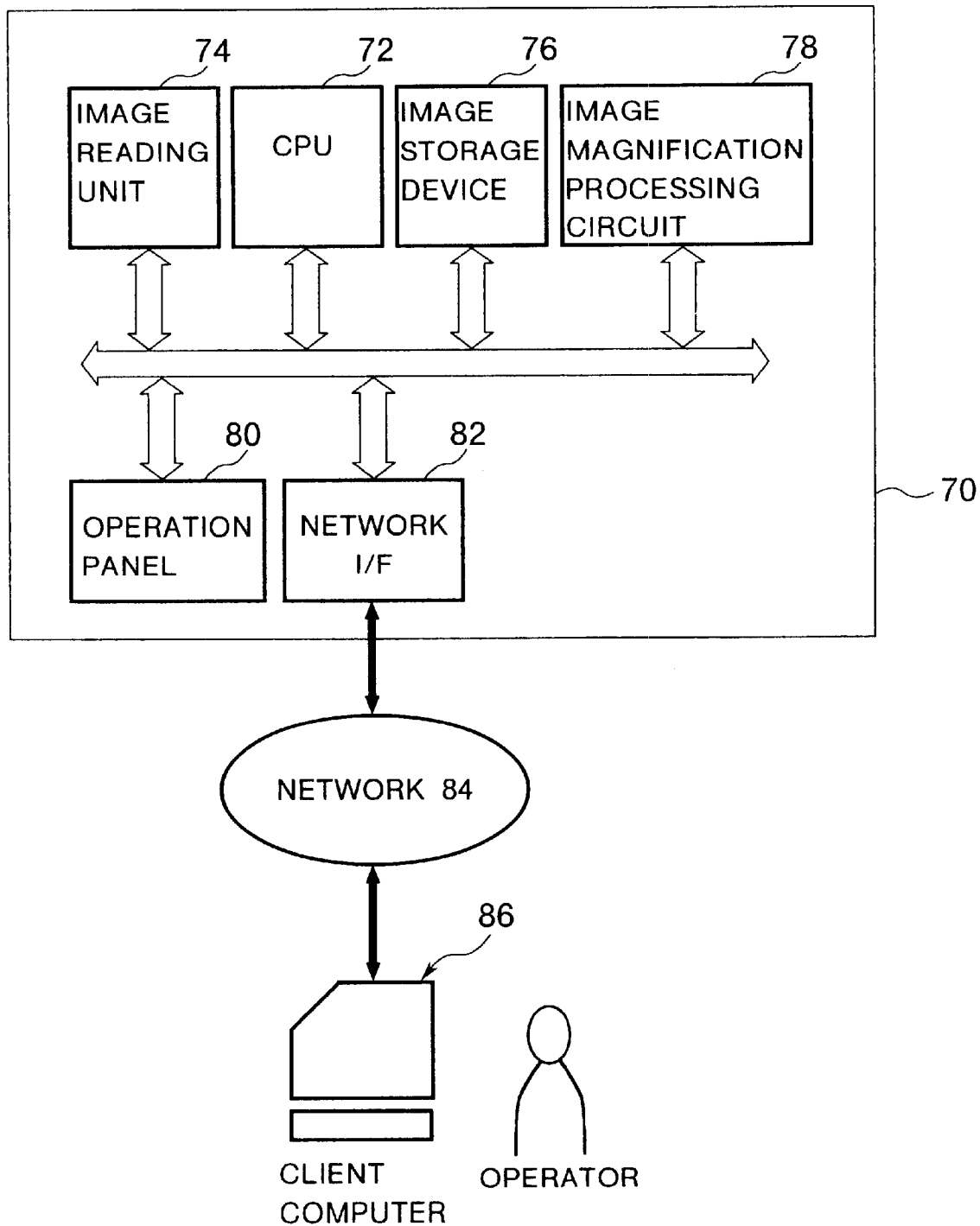
FIG. 5 is a schematic constructional block diagram of an embodiment corresponding to a network.
Figure 6:
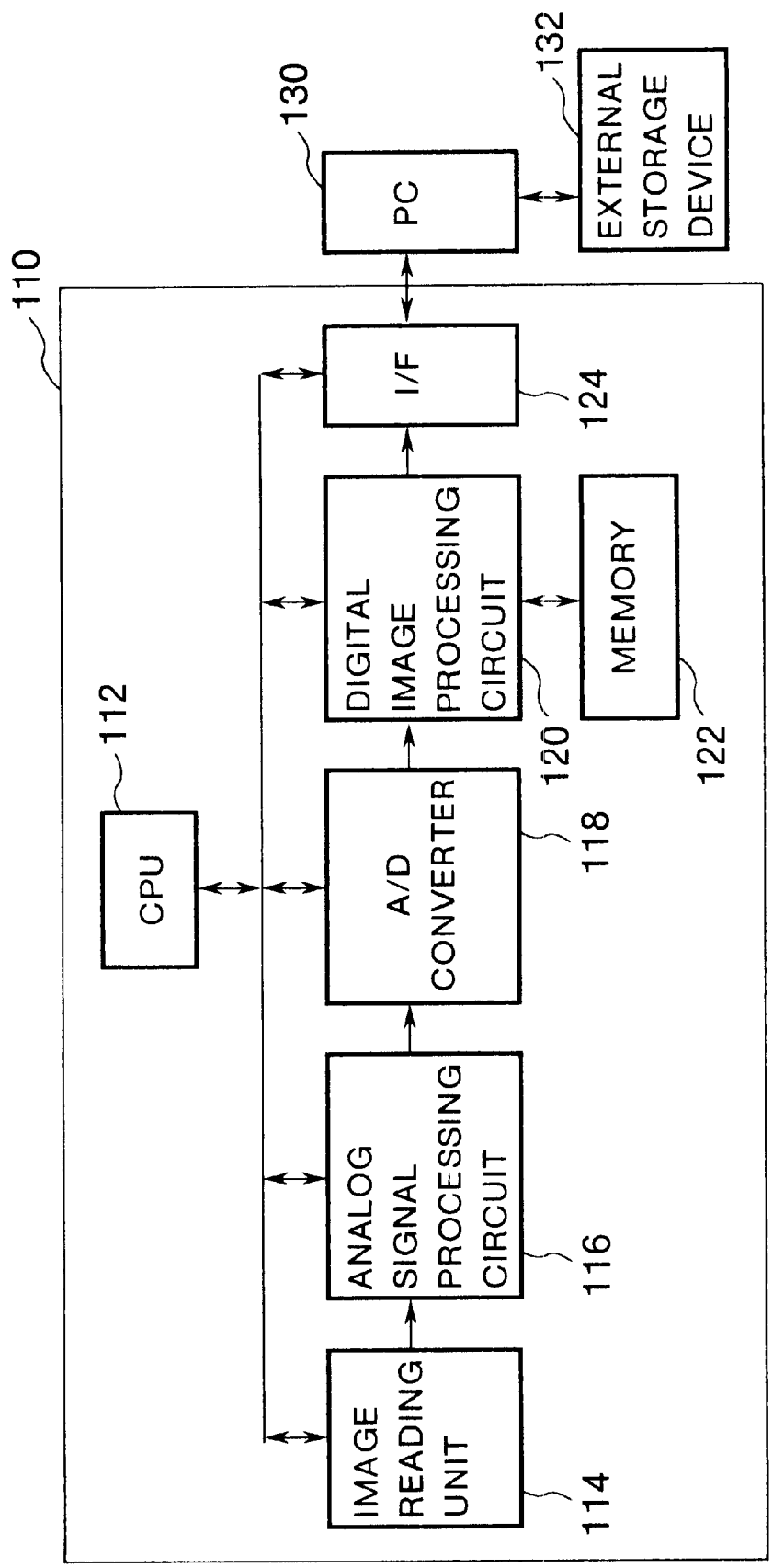
FIG. 6 is a schematic constructional block diagram of a conventional example.
Figure 7:
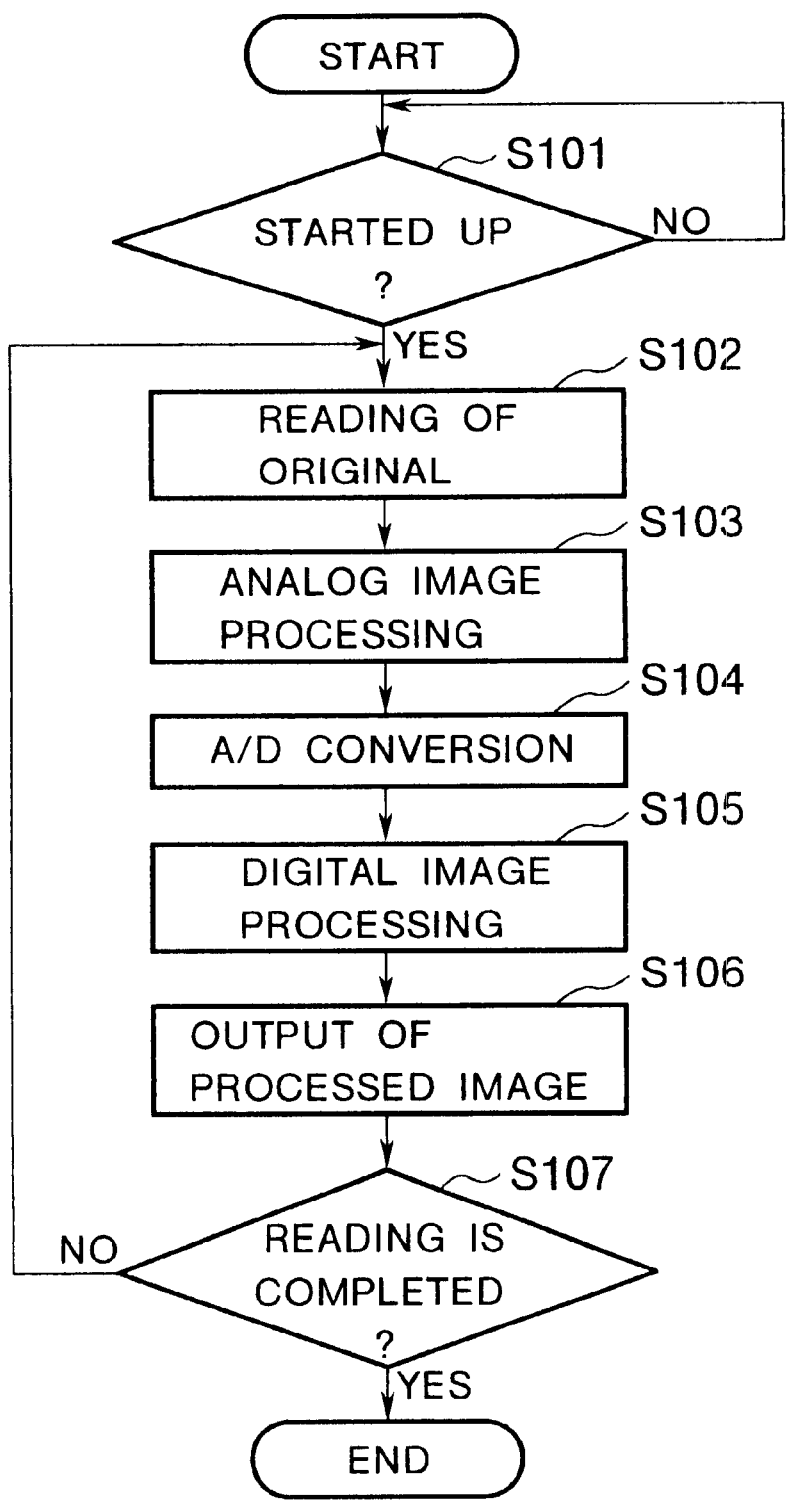
FIG. 7 is a diagram showing a processing flow of the conventional example.

The third embodiment which can solve the problems when the apparatus is made correspond to the network will now be described. FIG. 5 shows a schematic constructional block diagram of the embodiment. Reference numeral 70 denotes an image scanner of the embodiment. The image scanner 70 comprises: a CPU 72 to control the whole image scanner; an image reading unit 74 for reading an image of an original by a line sensor or the like; an image storage device 76 for storing the image data read by the image reading unit 74 at the highest optical resolution or for storing the image data after it was compressed; an image magnification processing circuit 78 for variably magnifying the image data of the maximum resolution that is stored into the image storage device 76; an operation panel 80 having a scan start button and the like; and a network interface 82. The image storage device 76 needs to have a large capacity so that the image data obtained by reading the original of a predetermined size at the optical maximum resolution can be stored. For example, the image storage device 76 is made up of a rewritable storage device of a large capacity such as hard disk, optical disk, magnetooptic disk, or the like.

The network interface 82 is connected to a network 84. A client computer 86 is connected to the network 84. The client computer 86 remote controls the image scanner 70 through the network 84.

The operation of the embodiment will now be described. The operator first puts an original to be read onto an original base plate of the image scanner 70 and depresses a scan start button of the operation panel 80 provided for the image scanner 70. Thus, the image reading unit 74 reads a whole readable range of the original on the original base plate at the maximum optical resolution of the image scanner 70. The read image data is stored into the image storage device 76.

The operator grasps the original and returns to the client computer 86 of the own seat and instructs so as to transmit a pre-scan image from the client computer 86 to the image scanner 70 through the network 84. In response to this instruction, the image scanner 70 transfers the image data stored in the storage device 76 to the image magnification processing circuit 78, thereby reducing or magnifying the image data of a low resolution corresponding to the pre-scan. The magnified image data is transmitted as pre-scanned image data to the client computer 86 through the network interface 82 and network 84.

The operator designates a reading range and a reading resolution while looking at the transmitted pre-scan image on the monitor screen of the client computer and sends those data to the image scanner 70.

The image scanner 70 extracts the reading range designated from the image data which is stored in the storage device and the magnification process is executed by the image magnification processing circuit 78 so as to obtain the designated resolution. The resultant image data is transferred as a read result to the client computer.

After the elapse of a predetermined time from the scan by the scan start button, the image scanner 70 automatically erases the image data stored in the storage device 76 in accordance with an erasing command from the client computer 86 or erases the image data even if the predetermined time does not elapse.

In the embodiment shown in FIG. 5, the image stored in the storage device 76 of the image scanner 70 can be read out even from any client computer connected to the network 84. However, this construction causes a problem when a secrecy of the original is high. To hold the secrecy, for example, it is sufficient to use a password as follows.

That is, when a ten-key or the like is provided on the operation panel and the operator first depresses the scan start button and performs the scanning process, it is constructed so that a password can be set by using the ten-key. When the image data obtained by scanning is stored into the storage device 76, the image scanner 70 simultaneously stores the set password as well so as to be concerned with the image data.

When the client computer (for example, computer 86) connected to the network 84 wants to read out the pre-scan image or the image in the designated range from the image scanner 70, the password which has already been set is first inputted and transmitted to the image scanner 70. The image scanner 70 collates the password from the network 84 with the password set upon scanning. Only when they coincide, the image scanner 70 transmits the requested image to the client computer (for example, computer 86) which sent the password.

As described above, according to the image scanner of each embodiment, the read original image can be temporarily stored in the storage device. Therefore, the information processing apparatus such as a computer or the like which is connected can execute another work even during the image reading operation.

Since the read image data is not stored in the hard disk on the computer side upon reading, the operator can read the original without being aware of the capacity of the hard disk of the computer or the like.

Further, by compressing the information by the encoding system which can be decoded by the computer or the like and storing the compressed data into the storage device, the image data can be transferred in the compressed state from the storage device to the computer or the like. Therefore, a transfer data amount is extremely reduced and the transfer time can be remarkably reduced.

Further, when constructing the apparatus so as to correspond to the network, the number of times of reciprocation of the operator between the own seat and the image reading apparatus can be reduced. Since the operator can always perform the processes with the original put near him, a danger such as theft or the like is remarkably reduced.

Many widely different embodiments of the present invention may be constructed without departing from the spirit and scope of the present invention. It should be understood that the present invention is not limited to the specific embodiments described in the specification, excepts as defined in the appended claims.

What is claimed is:

1. An image scanner which can be used by connecting to an external information processing apparatus, comprising:
   (a) reading means for reading an image of an original and outputting an image signal:
   (b) storing means for storing said image signal;
   (c) transfer means for transferring said image signal to said external information processing apparatus; and
   (d) mode switching means for switching a first mode to store said image signal into said storing means and to transfer the stored image signal by said transfer means and a second mode to transfer said image signal by said transfer means without storing it into said storing means, said mode switching means for switching a mode by an instruction from said external information processing apparatus.

2. An image scanner according to claim 1, further comprising compressing and decompressing means for compressing and encoding said image signal and supplying the compressed image signal to said storing means and for decoding the compressed image signal read out from said storing means and supplying said decoded image signal to said transfer means.

3. An image scanner according to claim 1, wherein said storing means is detachable to/from the scanner.

4. An image scanner which can be used by connecting to an external information processing apparatus, comprising:

(a) input means for inputting a read command, said input means being operable also to input a password together with said read command;
(b) reading means for reading an image of an original and outputting image data;
(c) storing means for storing said image data;
(d) an interface, connected to the external information processing apparatus, for inputting and outputting information;
(e) control means for controlling in a manner such that said reading means reads said original image in accordance with said read command and said storing means stores said image signal and the image signal stored in said storing means is read out in response to the command from the external information processing apparatus and is outputted to the external information processing apparatus through said interface; and
(f) password collating means,
wherein when said password collating means detects that the password inputted by said input means together with said read command was inputted from the external information processing apparatus, said control means outputs the image signal stored in said storing means to the external information processing apparatus through said interface.

5. An image scanner according to claim 4, wherein said control means erases the image signal stored in said storing means after the elapse of a predetermined time.

6. An image scanner according to claim 4, wherein said control means erases the image signal stored in said storing means in response to an erasing command from the external information processing apparatus.

7. An image scanner which can be used by connecting to an external information processing apparatus, comprising:
   (a) a reading unit adapted to read an image of an original and to output an image signal;
   (b) a storing unit adapted to store the image signal;
   (c) a transfer unit adapted to transfer the image signal to said external information processing apparatus;
   (d) a detecting unit adapted to detect a state of the external information processing apparatus; and
   (e) a mode switching unit adapted to switch a first mode to store the image signal into said storing unit and to transfer the stored image signal by said transfer unit and a second mode to transfer said image signal by said transfer unit without storing it into said storing unit in response to the detected state of the external information processing apparatus.

8. An image scanner according to claim 7, further comprising compressing and decompressing unit adapted to compress and encode said image signal and to supply the compressed image signal to said storing unit and adapted to decode the compressed image signal read out from said storing unit and to supply the decoded image signal to said transfer unit.

9. An image scanner according to claim 7, wherein said storing unit is attachable to and detachable from said scanner.

10. An image scanner which can be used by being connected to an external information processing apparatus, comprising:
   (a) an operation unit adapted to input a read command and a password;
   (b) a reading unit adapted to read an image of an original and output image data in response to the read command inputted by said operation unit;

(c) a storing unit adapted to store the image data and the password concerned with the image data; and (d) a controller adapted to perform a predetermined image processing on the stored image data and output the processed image data to the external information processing apparatus in response to an instruction from the external information processing apparatus, when a password inputted from the external information processing apparatus coincides with the stored password.

11. An image scanner according to claim 10, wherein said controller erases the image signal stored in said storing unit after the elapse of a predetermined time.

12. An image scanner according to claim 10, wherein said controller erases the image data stored in said storing unit in response to an erasing command from the external information processing apparatus.

13. An image scanner according to claim 10, wherein the predetermined image processing includes a magnification processing.

14. An image scanner according to claim 10, wherein the predetermined image processing includes a resolution conversion processing.

* * * * *

UNITED STATES PATENT AND TRADEMARK OFFICE
CERTIFICATE OF CORRECTION

PATENT NO. : 6,486,976 B1
DATED : November 26, 2002
INVENTOR(S) : Yasuyuki Nakamura et al.

It is certified that error appears in the above-identified patent and that said Letters Patent is hereby corrected as shown below:

Column 2,
Line 47, "an enough" should read -- a sufficient --; and
Line 61, "the own" should read -- his own --.

Column 3,
Line 5, "the own" should read -- his own --.

Column 7,
Line 14, "system" (first occurrence) should read -- systems --; and
Line 63, "correspond" should read -- to correspond --.

Column 8,
Line 27, "of the own" should read -- at his own --.

Column 9,
Line 30, "the own" should read -- his own --;
Line 38, "excepts" should read -- except --; and
Line 65, "detachable to/from" should read -- attachable to/detachable from --.

Column 10,
Line 50, "compressing" should read -- a compressing --.

Signed and Sealed this

Twenty-fourth Day of June, 2003

JAMES E. ROGAN
*Director of the United States Patent and Trademark Office*